United States Patent [19]

Calbo, Jr.

[11] 3,960,688

[45] June 1, 1976

[54] PROCESS FOR ELECTRODEPOSITING COATINGS ON METAL

[75] Inventor: Leonard Joseph Calbo, Jr., Ardsley, N.Y.

[73] Assignee: American Cyanamid Company, Stamford, Conn.

[22] Filed: Oct. 4, 1974

[21] Appl. No.: 512,282

[52] U.S. Cl. ............................................. 204/181
[51] Int. Cl.² ........................................ C25D 13/06
[58] Field of Search .................................... 204/181

[56] References Cited
UNITED STATES PATENTS

| | | | |
|---|---|---|---|
| 3,378,477 | 4/1968 | Gentles et al. | 204/181 |
| 3,663,389 | 5/1972 | Koral et al. | 204/181 |
| 3,663,485 | 5/1972 | Broecker | 204/181 |
| 3,681,224 | 8/1972 | Stromberg | 204/181 |

Primary Examiner—Howard S. Williams
Attorney, Agent, or Firm—James T. Dunn

[57] ABSTRACT

A process for electrodepositing on an electroconductive metal by immersing said metal in an aqueous dispersion of a blend of certain aminoplast cross-linking agents and certain non-gelled polymeric materials catalyzed with certain aromatic sulfonic acid compounds in stated proportions and then subjecting the aqueous dispersion to electrophoresis in order to deposit the catalyzed mixture on the metal as an adherent film.

10 Claims, No Drawings

PROCESS FOR ELECTRODEPOSITING COATINGS ON METAL

BACKGROUND OF THE INVENTION

Blends of resinous materials have been manufactured and sold for a substantial plurality of years and have been used extensively as coating compositions wherein the coating was applied by dipping, spraying, brushing, roller coating and the like. For a considerable period of time experimentations were conducted to determine the feasibility of electrodepositing films from aqueous dispersions of blends of resinous material onto electrically conductive metallic surfaces. More recent developments have shown that it is frequently desirable to make use of a blend of a cross-linkable polymeric material with an aminoplast cross-linking agent so that when the two components are deposited on the metallic surface, the entire composition can be converted to the cross-linked state by the application of heat such as by baking. The conversion of the entire composition from a thermosetting cross-linkable condition to a thermoset cross-linked state is sometimes enhanced by the use of a suitable curing catalyst which enables the two potential reactants to cross-link with one another more readily.

1. The Field of the Invention

The present invention is directed to a process for electrodepositing films on electroconductive metals in which said metal is immersed in aqueous dispersion of a mixture of a substantially water insoluble, substantially fully etherified, substantially fully methylolated melamine or a substantially water insoluble, substantially fully etherified, substantially fully methylolated guanamine or a substantially water insoluble, substantially fully butylated-urea formaldehyde reaction product, and certain water dispersible nongelled polymeric materials, containing as a curing catalyst for the first two reactive components, certain aromatic sulfonic acid compounds having an equivalent weight of at least 250 and having a molecular weight of at least 250 and subjecting the aqueous dispersion to electrophoresis in order to deposit the catalyzed mixture of the coating on the metal as an adherent film and thereafter curing the film with the assistance of the curing catalyst such as by baking the film at an elevated temperature.

2. Description of the Prior Art

The instant applicant is aware of the followng U.S. Pat. Nos.: 2,764,548; 3,471,388; 3,661,819; 3,663,389 and 3,798,193. Each of these U.S. patents is incorporated herein by reference, in order to avoid redundancy.

SUMMARY OF THE INVENTION

This invention relates to a process for electrodepositing films on electroconductive metal comprising immersing said metal in an aqueous dispersion of a mixture of from about 5% to about 40%, by weight, of (A) a substantially water insoluble, substantially fully etherified, substantially fully methylolated melamine, guanamine or urea and correspondingly from about 95% to about 60%, by weight, of (B) a water dispersible nongelled polymeric material carrying an ionic charge which polymer material contains at least one class of reactive groups selected from the group consisting of carboxyl groups, alcoholic hydroxy groups, amine groups and amide groups, wherein the amount of said groups is at least 3%, by weight, and not more than 30%, by weight, based on the total weight of said polymeric material; wherein said groups are heat reactive with (A); and as a curing catalyst for (A) and (B) from about 0.2% to about 10%, by weight, of (C) an aromatic sulfonic acid compound having an equivalent weight of at least 250 and a molecular weight of at least 250 and subjecting the aqueous dispersion to electrophoresis in order to deposit the catalyzed mixture of (A) and (B) on the metal as an adherent film; wherein the percentages of (A) and (B), by weight, total, 100% and are based on the total solids weight of (A) and (B) and the percentage weight of (C) is also based on the total solids weight of (A) and (B).

The invention further relates to the process in which the coated metal is rinsed with deionized water and then baked for about 30 minutes at about 250°F. in order to cross-link the two components (A) and (B) with the assistance of the curing catalyst (C).

DESCRIPTION OF THE PREFERRED EMBODIMENTS

The compositions used in the process of the present invention are composed of three essential components. The first component, identified as component (A), is an ungelled modified cross-linking agent comprising an aminoplast cross-linking agent that is prepared by reacting melamine or a guanamine with an aldehyde such as formaldehyde to produce a substantially fully methylolated melamine or a substantially fully methylolated guanamine. Any of the available guanamines may be used to produce the fully methylolated derivative such as benzoguanamine, formoguanamine, acetoguanamine, and the like. These fully methylolated triazine derivatives are then reacted with one or more monohydric aliphatic alcohols in which each of the methylol groups becomes substantially fully etherified. These alkyl ethers of the polymethylol triazines are shown in the U.S. Pat. No. 2,197,357 which discloses the plurality of various aminotriazines such as melamine and a plurality of guanamines that are reacted with aldehydes such as formaldehyde and are then alkylated by reaction with a substantial plurality of compounds containing an alcoholic hydroxy group. These cross-linking agents can be and preferably are monomeric although in certain instances lower polymers such as dimers, trimers and tetramers function very effectively. Illustrative of such a monomeric aminoplast cross-linking agent is the hexakis(methoxymethyl)melamine, and its higher analogues such as the hexakis(ethoxymethyl)melamine, the hexakis(propoxymethyl)melamine and the hexakis(butoxymethyl)melamine. These monomeric compounds can be prepared by a plurality of different processes such as those shown in the U.S. Pat. Nos. 2,918,452; 2,998,410 and 2,998,411. The unmixed ethers of the polymethylol triazines can be used. Additionally one can make use of the mixed ethers of these polymethylol triazines such as the triethylether, trimethylether of hexamethylol melamine or the tetrakis(alkoxymethyl)benzoguanamines which are disclosed in the U.S. Pat. No. 3,091,612. Mixed ethers of other polymethylol triazines are disclosed in the U.S. Pat. No. 2,454,495. A lengthy dissertation on fully mixed ethers of hexamethylol melamine is set forth in the U.S. Pat. No. 3,471,388. All of the above-mentioned U.S. patents are incorporated herein by reference in order to avoid unnecessary redundancy.

In addition to the triazine cross-linking agents set forth hereinabove, one can use alternatively certain water-insoluble, substantially fully etherified urea formaldehyde compounds, mixtures of such compounds or resins. The urea compounds should be etherified with at least a 4 carbon compounds, monohydric alcohols such as the butanol and preferably the n-butanol. Theoretically it is possible to react 4 mols of formaldehyde with 1 mol of urea to produce tetramethylol urea. This compound has been reported in the literature but many skilled chemists in the urea resin area doubt if this compound has, in fact, even been produced in isolateable quantities. It is deemed possible and, in fact, analytical results confirm that the trimethylol urea can be produced in detectable amounts. Such a product is considered to be substantially fully methylolated urea. By reacting such a compound or, mixture of compounds with an excess of n-butanol (more than 3 mols per mol of trimethylol urea) tri(butoxymethyl) urea can be produced which composition may contain dimers and trimers thereof. There is available commercially a low molecular weight (<1000) substantially methylol free (or fully etherified) butylated urea-formaldehyde resin. Such a cross-linking agent would provide bath stability which conventional butylated urea resins would not have.

In preparing the substantially water-insoluble, substantially fully butylated urea formaldehyde reaction products one would first prepare the substantially fully methylolated urea formaldehyde reaction product by reacting urea with an excess of formaldehyde such as 5 to 6 mols of formaldehyde per mol of urea or even greater amounts of formaldehyde so as to produce a urea derivative that is as fully methylolated as one can produce. This highly methylolated intermediate is then butylated under acidic conditions using an excess of butanol, at least 3-4 moles. In measuring the degree of methylolation and butylation of urea derivatives of this class, it would be appreciated that considerable amounts of low polymers are usually present. These are formed primarily by condensation of methylol groups to form methylene bridges. The result is that the product may be highly methylolated and fully etherified with a fairly low ratio of combined formaldehyde and butanol. Thus for example, if the ratio of formaldehyde to urea is 2.5 and the average degree of polymerization is two, this is equivalent to a trisubstituted urea derivative. Since many of the formaldehyde moieties are tied up in methylene bridges, these are fully reacted without butylation, substantially reducing the amount of butylation required for etherification. As a result, butylated urea derivatives useful in the present invention typically have combined mol ratios in the range of $UF_{2.3-2.7}Bu_{1.1-1.7}$.

It has been mentioned hereinabove that in addition to using these cross-linking agents in the preferred monomeric state, one may use low polymers of these reaction products such as the dimer, trimer, tetramers and the like. It is generally preferred however to utilize a cross-linking agent that has an average molecular weight not greater than about 1,000.

The second essential component used in the composition of the present invention is identified as component (B), and is a water-dispersible, non-gelled polymeric material carrying an ionic charge which polymeric material contains at least one class of reactive groups selected from the group consisting of carboxyl groups, alcoholic hydroxy groups, amine groups and amide groups, wherein the amount of said groups is at least 3%, by weight, and not more than about 30%, by weight, based on the total weight of said polymeric material wherein said groups are heat reactive with the cross-linking agent (A). These non-gelled polymeric materials can be adjusted so as to be used as an anionic material or as a cationic material and it is preferred to use the anionic materials.

The ionic water-dispersible non-gelled polymeric material contained in the composition used in the process of the present invention may be any one of the plurality of polymeric materials with reactive sites that are heat and/or catalytically reactive with the cross-linking agents contained in the composition used in the process of the present invention. The reactive sites may be either carboxyl groups and/or alcoholic hydroxy groups and/or amide groups and/or amino groups which polymeric materials are the result of vinyl polymerization. Therefore, all the polymerizable monomers in each of these four principal classes may be used to prepare the ionic polymeric materials contained in the compositions used in the process of the present invention.

The water-dispersible non-gelled polymeric materials containing carboxyl groups may be prepared by polymerizing an $\alpha$-$\beta$-ethylenically unsaturated carboxylic acid such as acrylic acid, methacrylic acid, crotonic acid, cinnamic acid, $\beta$-benzoyl acrylic acid, and polycarboxylic acids of the $\alpha$-$\beta$-ethylenically unsaturated class such as maleic, fumaric, itaconic, mesaconic, aconitic and the halogenated acids such as the halogenated maleic acid or more specifically, chloro maleic acid and the like. These carboxyl groups containing vinyl monomers may be copolymerized with one another or copolymerized with other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such polymerizable compounds as styrene, ortho-, meta- or para-alkyl styrenes such as the o-, m- or p- methyl, ethyl, propyl and butyl styrenes, 2,4-dimethyl styrene, 2,3-dimethyl styrene, vinyl naphthalene, acrylonitrile, methacrylonitrile, halo ring or side chain styrenes such as $\alpha$-chloro styrene, ortho-, meta- or para-chloro- styrenes, 2,4-dichlorostyrene, 2,3-dichlorostyrene, 2,5-dichlorostyrene or the alkyl side chain styrenes such as $\alpha$-methyl styrene, $\alpha$-ethyl styrene, and the like.

The polymeric materials containing alcoholic hydroxyl groups may be prepared by using a polymerizable vinyl monomer which contains an alcoholic hydroxyl group and is to be found in such compounds as the hydroxyl alkyl esters of $\alpha,\beta$, unsaturated monocarboxylic acid such as the hydroxy alkyl ester of acrylic acid, methacrylic, ethacrylic and chloro as well as the other halo substituted acrylic acids. These esters may either have a primary or a secondary hydroxy group. Illustrative of the types of compounds that are used to make these polymeric materials are 2-hydroxyethyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexyl methacrylate, 6-hydroxyoctyl methacrylate, 8-hydroxyoctyl methacrylate, 10-hydroxydecyl methacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another or with any of the polymerizable vinyl monomers set forth hereinabove containing carboxylic groups or with other vinyl monomers devoid of any alcoholic hydroxyl group including those set forth hereinabove in the discussion of the carboxyl group-containing monomers.

Among the amide groups containing monomers which may be used in the preparation of the water dispersible polymeric materials used in the present invention are acrylamide, methacrylamide, ethacrylamide, N-tertiarybutyl acrylamide, and the like. These polymerizable acrylamides may be used alone or in combination with one another to prepare polymeric materials used in the present invention or with any of the carboxyl group-containing monomers or the hydroxyl group-containing monomers or with any of the other polymerizable monomers set forth hereinabove.

These ionic polymeric materials can be broadly described as being selected from any one of the following classes: acrylic polymers, of which a substantial variety are vinyl and acrylic monomers and can be copolymerized with amino acrylates and methacrylates such as dimethylaminoethyl methacrylate, diethylaminoethyl acrylate, dimethylaminopropyl acrylamide, and t-butylaminoethyl methacrylate, and the like.

In the composition used in the process of the present invention there will be used from about 5% to about 40%, by weight, of (A) the substantially water insoluble, substantially fully etherified, substantially fully methylolated melamine, guanamine or urea and correspondingly from about 95% to about 60%, by weight, of (B) a water-dispersible non-gelled polymeric material carrying an ionic charge. It is preferred to use between about 20% and about 30%, by weight, of the amine derivative and correspondingly from about 80% to about 70%, by weight, of the non-gelled polymeric material.

The reactive monomers going into the preparation of the water-dispersible non-gelled polymeric material may be any one of, or a mixture of, or a total of all of those monomers set forth hereinabove containing the reactive groups selected from the group consisting of carboxyl groups, alcoholic hydroxy groups, amine groups and amide groups. It must be remembered that the amount of said groups should be at least about 3%, by weight, and not more than about 30%, by weight, based on the total weight of said polymeric material. The remainder of the polymeric material will be made up of moieties that are derived from polymerizable monomers which in the polymeric backbone chain will have no reactive groups. Illustrative of this category of monomers are the styrenes, the alkyl acrylates and the methacrylates and the acrylonitrile compounds. These latter compounds may be used either singly or in combination with one another and the ultimate properties of the final film will guide those skilled in the art in the selection of the particular monomers and the amount chosen for use in this polymeric material. For instance, if a hard film is desired, one would lean more heavily toward the styrenes whereas when a softer and more flexible and less brittle film is desired, one would lean toward the use of the alkyl acrylates in larger proportions.

The third essential component (C) of the composition used in the process of the present invention is an aromatic sulfonic acid compound having an equivalent weight of at least 250 and a molecular weight of at least 250. The amount of the sulfonic acid compound which is used may be varied between about 0.2% to about 10%, by weight, of the total solids weight of (A) and (B). The term aromatic sulfonic acid compound is intended to encompass those aromatic compounds that have attached to their aromatic ring or rings one or more sulfonic acids groups or the salts of said sulfonic acid groups including the sodium salts, the potassium salts, the lithium salts, the ammonium salts, and the like. The aromatic sulfonic acid compound may have a single aromatic ring such as the benzene derivatives or a diaromatic ring such as the naphthalene compounds. Additionally these aromatic sulfonic acid compounds may be selected from the benzophenone class of compounds in which two benzene rings are joined through a keto group. These aromatic sulfonic acid compounds function as a curing catalyst in enabling one to get the component (A) to react with the component (B) after it has been deposited by electrophoresis on an electroconductive metal substrate. These catalysts should have sufficient hydrophobicity in order to associate with the organic phase of the emulsion or dispersion and thereby codeposit on the metal substrate. These aromatic sulfonic acid compounds may have on the aromatic ring or rings in addition to the sulfonic acid group or sulfonic acid salt group other substituents such as alkyl substituents, hydroxyl substituents, alkoxy substituents, nitro substituents and halo substituents as well as carboxyl substituents. The amount of these sulfonic acid compounds which may be used in the composition used in the process of the present invention may vary between about 0.2%, by weight, and 10%, by weight, based on the total weight of the binder solids of (A) and (B). It is preferred to use between about 0.5% and 2.0%, by weight, of the sulfonic acid compound, same basis. The length of the alkyl and alkoxy substituents in the total number of carbon atoms will be limited to those that are sufficient to provide the required molecular weight.

Among one category of aromatic sulfonic acid compounds which may be used are the dialkyl napthalene disulfonic acids such as the dinonyl-naphthalene disulfonic acids and more particularly the 2,6-dinonyl-naphthalene-4, 8-disulfonic acid. The position of the substituents on the ring is not critical and as a consequence the alkyl groups may be on the same aromatic ring with the sulfonic acid groups or they may be on the same ring with a different or the same alkyl group while the sulfonic acid group is on the other aromatic ring in a naphthalene compound alone or with an additional sulfonic acid group. Illustrative of this class of disulfonic acid compounds are the dihexyl naphthalene disulfonic acids, the diheptyl naphthalene disulfonic acids and the dioctyl naphthalene disulfonic acids, the didecyl naphthalene disulfonic acids and the like.

Another category of the aromatic sulfonic acid compounds which may be used are the alkyl benzene sulfonic acids that have a molecular weight of at least 250 and equivalent weight of at least 250. The alkyl group's position on the benzene ring is preferably in the meta or para position with respect to the sulfonic acid group in order to avoid any possibility of steric hindrance if it were in the ortho position. One may use for instance the meta nonyl benzene sulfonic acid, the para decyl benzene sulfonic acid, the para undecyl benzene sulfonic acid, the para dodecyl benzene sulfonic acid, and the like.

Illustrative of those aromatic sulfonic acids which may be used are those which contain nitro groups or hydroxy groups and more particularly compounds such as 2,4-dinitro-1-hydroxy-7-naphthalene sulfonic acid. This compound has a molecular weight of 300 and an equivalent weight of 300. This particular sulfonic acid compound functions very favorably in curing the blend (A) and (B) but it tends to impart a slightly yellowish tinge to the color of the film which would be objectionable perhaps to some in clear films or white or pastel color films. However, in darker colors, this particular catalyst would not be objectionable to anyone.

Illustrative of the aromatic sulfonic acid compounds that are used as a salt of the sulfonic acid are the compounds known commercially as Aersol-OS which is sold as a mixture containing about 10% of the monopropyl derivative, about 80% of the dipropyl derivative and about 10% of the tripropyl derivative of the naphthalene sulfonic acid sodium salt. A more specific illustration of a compound falling into this category is the 2,4-dipropyl, naphthalene-8 sodium salt of sulfonic acid.

One may also use the benzophenone sulfonic acid derivatives such as the 2-hydroxy, 4-methoxy, 5-sulfonic acid benzophenone, and the like.

Although most of the aromatic sulfonic acid compounds, as defined, are useful as catalytical materials in practicing the process of the present invention, one should avoid those sulfonic acid compounds which have in the compound a reactive alkaline group that will interfer with the catalytical reactivity of the sulfonic acid compound. The presence of the amino groups in a sulfonic acid compound will result either in a poor cure or in no cure at all. Such compounds as 5-amino-2-naphthalene sulfonic acid or 4,4'-diaminostilbene-2, 2'-disulfonic acid have the same number of amino groups as sulfonic acid groups and therefore are not suitable for use in the present invention. It is, therefore, desirable to have at least one sulfonic acid group per moiety in excess of the number of basic or alkaline groups in the same compound. To express it another way, the sulfonic acid compound should have more sulfonic acid groups than it has reactive alkaline groups.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except that as indicated in the appended claims.

EXAMPLE 1

Into a suitable high speed disperser there is introduced 286 parts of a 75% solution of a terpolymer of 55% of n-butylacrylate, 30% of styrene and 15% of acrylic acid dissolved in butanol together with 71 parts of the triethyl ether, trimethyl ether of hexamethylol melamine. These two components are blended together and then there is introduced into the blend 42.5 parts of diisopropanol amine. After the diisopropanol amine is blended into the first two components, there is added to that blend 114 parts of rutile titanium dioxide and the entire mixture is stirred for about 30 minutes at high speed. The total mixture is then emulsified with 3,500 parts of deionized water. The emulsion is permitted to age for about 16 hours. Thereupon the emulsion is transferred into a metal container. To the metal container or tank there is added 4.2 parts of 2,6-dinonylnaphthalene-4,8-disulfonic acid which has been neutralized to a pH of 8 with dimethyl amino ethanol. The metal container or tank is used as the cathode and the steel panel is used as the anode. At a deposition condition of 200 volts for 1 minute, a film is deposited on the steel panel. The panel is removed from the metal container and is rinsed with deionied water and is then baked for 30 minutes at 250°F. The resulting film resisted 200 methyl ethyl ketone rubs and gave a Knoop hardness of 4.5. A film deposited from a control bath which did not contain any of the sulfonic acid catalyst was washed with deionized water and baked under similar conditions but it withstood only three methyl ethyl ketone solvent rubs and gave a Knoop hardness of less than 2.

EXAMPLE 2

An electrocoating bath is prepared as in Example 1 by blending 570 parts of a 75% solution of the same acrylic terpolymer used in Example 1 dissolved in butanol, 142 parts of hexakisbutoxymethylmelamine and 86 parts of a 50% aqueous solution of diisopropanol amine. These components are blended together and then there is added 228 parts of titanium dioxide. The mixture is dispersed on the high speed disperser for about 30 minutes. Sufficient quantity of deionized water is added slowly to reduce the solids level to about 10%. The bath is aged for about 24 hours and is then filtered through a 5 micron flannel cloth. The filtered bath was then divided into equal parts and each part was placed into each of two metal containers identified as containers (a) and (b). To the (b) bath there is added 20 parts of a 20% solution of 2,6-dinonylnaphthalene-4,8-disulfonic acid dissolved in isopropanol and neutralized with dimethylethanol amine. A steel panel is immersed in this bath and then is connected to the anode. The bath container is connected to the cathode and 200 volts of electricity are applied for one minute and a 1.0 mil. film is electrodeposited. The thus coated panel is rinsed with deionized water and is then baked for 30 minutes at 250°F. producing a smooth glossy film that was resistant to 200 rubs with a towel soaked with methyl ethyl ketone. The bath (a) is used without benefit of any catalytic material and a steel panel is immersed in the bath and is connected to the anode and the bath container is connected to the cathode and 200 volts of electricity are applied for one minute and a 1.0 mil. film is deposited. The coated panel is rinsed with the deionized water and is baked for 30 minutes at 250°F. The film produced from bath (a) withstood only 15 methyl ethyl ketone rubs.

EXAMPLE 3

Into a suitable mixing vessel as in Example 1 there is introduced 570 parts of a 75% solution of the same acrylic resin as was used in Example 1 dissolved in n-butanol, 142 parts of diethylether dimethylether of tetramethylolbenzoguanamine and 90 parts of a 50% solution of diisopropanol amine in water. After a thorough blending of these components there is added to the blend 228 parts of titanium dioxide and the total mixture is ground on a high speed dissolver for 20 minutes. Deionized water is slowly added to reduce the solids level to about 10%. At this point a procedure comparable to that followed in Example 2 with regard to aging, filtration and electrodeposition is observed.

Again the blend is divided into two substantially equal portions and each is deposited in a metal container, the first identified as container (a) containing no catalysts and the second identified as container (b) containing 8.0 parts of a 20% solution of 2,6-dinonylnaphthalene-4,8-disulfonic acid in isopropanol and preneutralized with dimethylethanol amine. A film of about 0.9 mil. thickness is anodically deposited on each of the two steel substrates in baths (a) and (b) by applying 200 volts of electricity for 60 seconds. Each of the panels were then rinsed with deionized water and baked for 30 minutes at 275°F. The panel from the bath (b) gave a Knoop hardness of 6.5 and a pencil hardness of F-H. Additionally the film was resistant to 200 methyl ethyl keton rubs. The panel from bath (a) (no catalysts) gave a Knoop hardness of 1.3, a pencil hardness of 2B and withstood only 50 methyl ethyl ketone rubs.

EXAMPLE 4

A modified acrylic resin is prepared by polymerizing 125 parts of styrene, 325 parts of butylacrylate, 65 parts of maleic anhydride and 2 parts of sulfoethyl methacrylate. After this tetrapolymer is prepared it is reacted with 60 parts of 1,2-propylene glycol. The hetero 0-moiety from the maleic anhydride is opened by reaction with the 1,2-propylene glycol so as to provide both carboxyl and hydroxyl functions pending from the backbone of the tetrapolymer. Into a suit able blending vessel as in Example 1 there is introduced 286 parts of this modified acrylic resin containing both hydroxyl and carboxyl functions, 71 parts of the triethylether, trimethylether of hexamethylol melamine and 48 parts of a 50% aqueous solution of diisopropanol amine. After these three components are thoroughly blended with one another there is added 114 parts of titanium dioxide and stirring is continued to produce a homogeneous blend. Two electrocoating baths were prepared in a manner similar to that in Example 2. The first, bath (a) contained no catalysts, while the second bath (b) contained 10 parts of a 20% alcoholic solution of 2,6-dinonyl-naphthalene-4,8-disulfonic acid neutralized with dimethylethanol amine. Steel panels were coated to a 1.0 mil thickness in each of the baths by the anodic deposition at 150 volts for 90 seconds and the panels were then washed in deionized water and baked for 30 minutes at 250°F. The Knoop hardness was 2.1 for the uncatalyzed bath (a) and 4.5 for the catalyzed bath (b). The methyl ethyl ketone resistance for the panel from bath (a) was 20 rubs whereas the resistance for the panel from bath (b) was 200 rubs.

EXAMPLE 5

A master batch of electrocoating paint is prepared by blending 570 parts of a 75% solution of the terpolmer of Example 1 dissolved in n-butanol, 144 parts of the triethylether, trimethylether of hexamethylol melamine and 90 parts of a 50% aqueous solution of diisopropanol amine in a blending machine as in Example 1. To this blend there is added 230 parts of titanium dioxide and the mixture is dispersed in the high speed dissolver for about 30 minutes. Deionized water is slowly added to reduce the solids level to 10%. After aging the coating composition for 24 hours, the bath is filtered through a 5 micron flannel filter. Two portions of about 1000 parts each of the above bath are placed in separate containers. To the first container there is added 1.5 parts of 5-amino-2-naphthalene sulfonic acid. This sulfonic acid compound has a molecular weight of 223 and an equivalent weight of 223 and is therefore outside of the scope of the present invention. A steel panel is immersed in this bath and is connected to the anode. The metal container is connected to the cathode and 170 volts is applied for 60 seconds producing a 0.8 mil film. The panel is removed from the container and rinsed with deionized water and baked for 30 minutes at 250°F. The solvent resistance of the cured film was only 15 methyl ethyl ketone rubs indicating little or no cure.

To the second 1000 part portion of the master bath there is added 7.5 parts of a 10% isopropanol solution of 1-hydroxy-2,4-dinitro-7-naphthalene sulfonic acid which had been neutralized to a pH of 8 with diisopropanol amine. A panel was coated by the procedure described immediately hereinabove and after rinsing in deionized water, the panel was baked for 30 minutes at 250°F. The cured film (0.7 mil.) was smooth and glossy but slightly yellow in color. The film was resistant to 200 methyl ethyl ketone rubs and gave a Knoop hardness of 6.4. A similar panel prepared from a bath containing no catalyst material and cured in the same fashion gave a Knoop hardness of less than 2 and withstood only 5 methyl ethyl ketone rubs.

A third 1000 part portion of the master bath is introduced into a suitable metallic container and to the bath there is added 0.75 parts of 2-hydroxy, 4-methoxy, 5-benzophenone-sulfonic acid. A panel was coated with this composition using the previously described methods and the film after rinsing with deionized water was cured for 30 minutes at 250°F. giving the film a Knoop hardness of 4.4. The film (0.8 mil.) was resistant to 200 methyl ethyl ketone rubs.

Using an additional 1000 part portion of the master bath there is added 5 parts of paradodecylbenzene sulfonic acid cut to a 20% solids in isopropanol and neutralized with dimethylethanol amine. This portion of the master bath is aged over night and a 1.0 mil. film was anodically deposited onto a steel substrate. After rinsing with deionized water, the panel was baked for 30 minutes at 250°F. The resulting film had a Knoop hardness of 5.6, a pencil hardness of F and was resistant to 200 methyl ethyl ketone rubs.

EXAMPLE 6

A standard white electrocoating paint is prepared by blending 570 parts of a n-butanol solution of the same acrylic terpolymer used in Example 1, 142 parts of the triethylether, trimethylether of hexamethylol melamine, and 86 parts of a 50% aqueous solution of diisopropanol amine. After these three components are thoroughly blended there is added 228 parts of titanium dioxide. The mixture is stirred with high speed agitation on a commercially available disperser for 30 minutes. The deionized water is then slowly added bringing the solids level down to about 10%. A bath is aged over night and filtered through a 5 micron flannel cloth. The bath is then divided equally into 2 portions and each portion is placed in a separate metal container. Into the first container there is placed 4.2 parts of a neutralized 40% solution of p-toluene sulfonic acid in isopropanol. The neutralizing agent is dimethylethanol amine. Into the second container there is charged 4.2 parts of a 40% isopropanol solution of 2,6-dinonyl-naphthalene 4,8 sulfonic acid which had been neutralized also with the dimethylethanol amine. Steel panels are prepared from each of these baths by anodic deposition of an 0.8 mil film. A control panel is also prepared from a similar bath but which did not contain any sulfonic acid catalyst. The panels were baked for 30 minutes at 275°F. and the results are listed in Table 1 set forth hereinbelow.

TABLE I

| Catalyst Level % on Binder Solids | Knoop Hardness | Double MEK Rubs |
|---|---|---|
| 1. PTSA 1.25 (Comparative) | 2.8 | 80 |
| 2. DNNDSA 1.25 | 5.0 | 200 |
| 3. none (Comparative) | 1.7 | 75 |

Although showing a slight improvement in hardness over the control, the p-toluene sulfonic acid catalyzed coating was not nearly as effective as the 2,6-dinonyl naphthalene 4,8-disulfonic acid catalyzed coating. The catalyst level was then raised to 2.5% on binder solids and a coating of 1.0 mil. thickness was electrodeposited onto zinc phosphate treated steel panels. The panels were rinsed and baked for 30 minutes at 275°F. The results are set forth in Table II hereinbelow:

TABLE II

| | Catalyst Level % | Knoop Hardness | 20° Gloss |
|---|---|---|---|
| 1. PTSA (Comparative) | 2.5 | 3.9 | 15 |
| 2. DNNDSA | 2.5 | 6.4 | 50 |

The panels prepared from the p-toluene sulfonic acid catalyzed bath were rough in appearance and had a very low gloss, indicating poor and uneven deposition characteristics compared to the smooth and glossy films produced from the second bath. In addition, the corrosion resistance of the first bath was much poorer than the second bath producing 12 mm. creep after 240 hours of exposure to salt spray on zinc phosphated steel compared to 1.0 mm. creep for the second bath catalyzed with the 2,6-dinonyl naphthalene 4,8-disulfonic acid. The corrosion test employed was carried out according to ASTM specification 117B-64.

After three weeks of static aging, the first bath deteriorated badly as evidenced by softer films which were pitted and unevenly coated. Some of the titanium dioxide pigment had precipitated. The second bath catalyzed with the 2,6-dinonyl naphthalene 4,8-disulfonic acid on the other hand gave smooth, glossy films without any loss in hardness.

It is within the purview of the present invention to incorporate various dyes and pigment additives to impart color to the polymeric compositions used in the process of the present invention. For instance, compatible dyes or pigments such as $TiO_2$, $Fe_2O_3$, metal chromates, such as lead chromates, or carbon black can be used, such that the resulting coated metal substrate is white, red, yellow, black or any desired color. If a clear coating is desired, all pigments and coloring materials can be omitted. Usually, the amounts of pigment incorporated in the coating composition range from about 0.1% to about 6% of the overall bath when employing electrocoating techniques.

The composition used in the process of the present invention may be diluted with water to concentrations varying between about 3% and 30% and, preferably, between about 7% and 15%, by weight, based on the total resin solids in the solution or dispersion.

The compositions used in the process of the present invention, particularly those that are carboxyl group containing are readily solubilized by the use of amines wherein there is formed an amine salt with the -COOH group, i.e. $-COO^-HNR_3$. These amines may be a primary, secondary or tertiary in nature, the only restriction being sufficient basicity so as to react with the carbonyl group. Generally secondary and tertiary amines are chosen because of their greater basicity, allowing the formulator the flexibility of using less amine. The result is easier control, and better amine balance in the electrocoating tank. the alkanol amines, such as diisopropanol amine and diethyl amino ethanol are two of the most commonly used amines for this purpose because of their pK strength (~9) and their ability to produce stable emulsions.

In the preparation of electrocoating paint, the polymer, cross-linking agent, the amine and, if desired, the pigment are blended together. To the blend, water, and preferably deionized water is added slowly. In the initial stages of the water addition, a viscosity build-up occurs as the amine neutralized polymer begins to dissolve. At a certain point in the addition, usually around 40–50% solids, phase inversion occurs with a characteristic sudden drop in viscosity. At this point the system has been converted to a oil-in-water (O/W) emulsion. The polymer and cross-linking agent are then incorporated within micelles which are surrounded by water molecules. Inorganic bases such as lithium, sodium and potassium hydroxide can also be used for the emulsion preparation.

The sulfonic acid compound which is used as the catalyst may be added prior to the emulsification or may be added directly to the electrocoating bath. When the catalyst is added to the mixture of ingredients which are about to be ground together to produce a paint, precaution must be taken to add sufficient excess amine to neutralize the catalyst, since the catalyst, being a strong acid, will preferentially consume some of the amine present. Under these conditions, improper grinding, poor pigment wetting and poor emulsification will result. There is also a possibility that the heat generated during the grinding process could cause some cross-linking between the cross-linking agent and the non-gelled polymeric material if the sulfonic acid groups are not blocked. When adding the catalyst directly to the bath, pH's below about 6 should be avoided because precipitation of the polymeric material may result. Typical anodic electrocoating tanks generally operate in the pH range of 7.5–8.5 which is a preferred range for the catalyzed system used in the present invention. However, over short periods of time such as several days to about one week, it may be possible to operate at a pH as high as 10–11. Such conditions, however, are detrimental to the cross-linking agent. Even electrocoating paints which have been emulsified with the use of KOH are normally maintained at a pH of 7.5–8.5.

When the coatings have been electrodeposited on the electrocoated metal, the films are rinsed with deionized water and the films are then baked in order to achieve cure. The curing temperature may be as low as 225°F. at catalyst levels of about 3–6%. Faster curing schedules can also be achieved. The formulation given in Example 1, hereinabove, can be cured a 350°F. in 5 minutes whereas the comparable formulation devoid of catalyst would require 20 minutes at 350°F. in order to achieve a cure. The amount of 2,6-dinonyl-naphthalene-4,8-disulfonic acid used in Example 1 amounted to 2.5% applied as a 40% solution of the acid in alcohol. This faster cure rate results in higher production capabilities. By curing at lower temperatures such as by curing for 30 minutes at 250°F. there is achieved the added benefit of much improved salt spray resistance which is illustrated in the following example.

EXAMPLE 7

Into a suitable high speed disperser as used in Example 1, there is introduced 570 parts of a 75% solids solution in butanol of the same terpolymer used in Example 1, 142 parts of the triethylether, trimethylether of hexamethylol melamine, 46 parts of diisopropanol amine, 172 parts of titanium dioxide, 46 parts of aluminum silicate, and 10 parts of lead chromate. The mixture is dispersed in the high speed disperser for about 30 minutes. Deionized water is slowly added and the mixture emulsified under high speed agitation. sufficient water is then added to reduce the solids to 10%. The bath is aged overnight, filtered and divided into two equal portions and identified as (a) and (b). To the portion (b) there is added 3 parts of 2,6-dinonyl-naphthalene-4,8-disulfonic acid. Untreated (bare) steel panels are anodically coated with 1.0 mil film thickness by the technique previously described. A comparable panel coated with the coating of bath (a) is baked for 20 minutes at 350°F. whereas the film produced from bath (b) is baked for 30 minutes at 250°F. Both panels have a Knoop hardness of 6.5. Both panels are then subjected to salt spray corrosion tests conforming to ASTM standard Test No. B117-64. After 100 hours exposure to the salt spray exposure, the panel from bath (a) shows approximately 10 mm. creepage along the scribe line while the panel from bath (b) shows 0.5 mm. creepage.

EXAMPLE 8

Into a suitable high speed blender as used in Example 1, there is introduced 534 parts of a 75% solution in n-butanol of the same terpolymer used in Example 1 together with 172 parts of a low molecular weight methylol free, butylated urea-formaldehyde resin identified hereinabove, 40 parts of diisopropanol amine and 224 parts of titanium dioxide. The mixture is dispersed in the high speed blender for 20 minutes. Deionized water is slowly added until the solids have been reduced to about 10%. The diluted bath is then aged for 16 hours and filtered through a 5 micron flannel. The filtered bath is divided into two equal portions and identified as portions (a) and (b). To the (b) bath is added 15 parts of a 20% solution of 2,6-dinonyl-naphthalene-4,6-disulfonic acid in isopropanol. Steel panels are coated from each of these baths as previously described in Example 7 to a 1.0 mil film thickness. Each of the panels are baked for 20 minutes at 300°F. (149°C.). The panel from which (a) gave a very soft film which did not have any solvent resistance whereas the film from bath (b) had a Knoop hardness of 7.8 and was resistant to 200 methyl ethyl ketone solvent rubs.

Bath (b) was stable for more than 30 days and still produced films that were smooth and glossy.

I claim:

1. A process for electrodepositing films on electroconductive metal comprising immersing said metal in an aqueous dispersion of a mixture of from about 5% to about 40%, by weight, of (A) a substantially water-insoluble, substantially fully etherified, substantially fully methylolated melamine; a substantially water-insoluble, substantially fully etherified, substantially fully methylolated guanamine or a substantially water-insoluble, substantially fully butylated urea-formaldehyde reaction product and correspondingly from about 95% to about 60%, by weight, of (B) a water dispersible non-gelled polymeric material carrying an ionic charge which polymeric material contains at least one class of reactive groups selected from the group consisting of carboxyl groups, alcoholic hydroxy groups, amine groups and amide groups, wherein the amount of said groups is at least 3%, by weight, and not more than about 30%, by weight, based on the total weight of said polymeric material; wherein said groups are heat reactive with (A); and as a curing catalyst for (A) and (B) from about 0.2% to about 10%, by weight, of (C) an aromatic sulfonic acid compound having an equivalent weight of at least 250 and subjecting the aqueous dispersion to electrophoresis in order to deposit the catalyzed mixture of (A) and (B) on the metal as an adherent film; wherein the percentages of (A) and (B), by weight, total 100% and are based on the total solids weight of (A) and (B) and the percentage weight of (C) is also based on the total solids weight of (A) and (B).

2. The process according to claim 1 in which the coated metal is rinsed with deionized water, the film baked to produce a hard cross-linked coating.

3. The process according to claim 1 in which the aromatic sulfonic acid compound is a naphthalene disulfonic acid.

4. The process according to claim 3 in which the naphthalene disulfonic acid is 2,6-dinonyl-naphthalene-4,8-disulfonic acid.

5. The process according to claim 1 in which the aromatic sulfonic acid compound is p-dodecylbenzene sulfonic acid.

6. The process according to claim 1 in which the aromatic sulfonic acid compound is 2,4-dinitro-1-hydroxy-7-naphthalene sulfonic acid.

7. The process according to claim 1 in which the aromatic sulfonic acid compound is 2-hydroxy, 4-methoxy, 5-sulfonic acid-benzophenone.

8. The process according to claim 1 in which the aromatic sulfonic acid compound is present in an amount between about 0.5 percent and 2.0 percent, by weight, based on the total solids weight of (A) and (B).

9. The process according to claim 1 in which the aromatic sulfonic acid compound is 2,4-dipropyl-naphthalene 8-sulfonic acid sodium salt.

10. The process according to claim 1 in which the (A) is the triethyl ether, trimethyl ether of hexamethylol melamine.

* * * * *